(12) United States Patent
Shula et al.

(10) Patent No.: US 11,655,870 B2
(45) Date of Patent: May 23, 2023

(54) METHOD FOR MANUFACTURING COMPOSITE FIBER PREFORM FOR DISC BRAKES

(71) Applicant: Honeywell International Inc., Morris Plains, NJ (US)

(72) Inventors: Brian Shula, South Bend, IN (US); Christopher Evans, Granger, IN (US); David L. Charles, South Bend, IN (US); Slawomir T. Fryska, Granger, IN (US)

(73) Assignee: Honeywell International Inc., Charlotte, NC (US)

( * ) Notice: Subject to any disclaimer, the term of this patent is extended or adjusted under 35 U.S.C. 154(b) by 743 days.

(21) Appl. No.: 16/596,585

(22) Filed: Oct. 8, 2019

(65) Prior Publication Data

US 2021/0102591 A1    Apr. 8, 2021

(51) Int. Cl.
*B29C 43/02*    (2006.01)
*B29C 70/24*    (2006.01)
(Continued)

(52) U.S. Cl.
CPC ............ *F16D 69/023* (2013.01); *B29C 70/32* (2013.01); *B29K 2307/04* (2013.01);
(Continued)

(58) Field of Classification Search
CPC .. B32B 5/02; B32B 5/026; B32B 5/26; F16D 65/123–128; F16D 69/023;
(Continued)

(56) References Cited

U.S. PATENT DOCUMENTS 5,348,598 A    9/1994  Vives et al.
5,662,855 A    9/1997  Liew et al.
(Continued)

FOREIGN PATENT DOCUMENTS

DE    69213103 T2    4/1997
EP    2955260 A1    12/2015
(Continued)

OTHER PUBLICATIONS

Liu et al., "Producing superior composites by winding carbon nanotubes onto a mandrel under a poly(vinyl alcohol) spray", Elsevier, vol. 49, Available online Jun. 30, 2011, pp. 4786-4791.
(Continued)

*Primary Examiner* — Christopher P Schwartz
(74) *Attorney, Agent, or Firm* — Shumaker & Sieffert, P.A.

(57) ABSTRACT

A method that includes winding a composite fabric around a mandrel to form a plurality of layers defining an annulus extending along a central longitudinal axis, where the composite fabric includes a plurality of elongate axial fibers extending substantially in an axial direction relative to the longitudinal axis and a plurality of elongate circumferential fibers extending substantially in a circumferential direction relative to the longitudinal axis; and introducing, into at least a portion of the plurality of layers, a plurality of radial fibers extending substantially in the radial direction relative to the longitudinal axis, where the plurality of radial fibers mechanically bind one or more adjacent layers of the plurality of layers.

20 Claims, 7 Drawing Sheets

(51) Int. Cl.
| | |
|---|---|
| *F16D 69/02* | (2006.01) |
| *B29C 70/32* | (2006.01) |
| *B29K 307/04* | (2006.01) |
| *B29L 31/16* | (2006.01) |
| *B29L 31/30* | (2006.01) |
| *B64C 25/42* | (2006.01) |
| *F16D 65/12* | (2006.01) |
| *F16D 65/02* | (2006.01) |
| *F16D 69/00* | (2006.01) |

(52) U.S. Cl.
CPC ... *B29L 2031/16* (2013.01); *B29L 2031/3076* (2013.01); *B64C 25/42* (2013.01); *F16D 65/126* (2013.01); *F16D 2065/132* (2013.01); *F16D 2065/1308* (2013.01); *F16D 2069/008* (2013.01); *F16D 2200/0052* (2013.01); *F16D 2200/0065* (2013.01); *F16D 2250/00* (2013.01); *F16D 2250/0092* (2013.01)

(58) Field of Classification Search
CPC ....... F16D 2065/132; F16D 2065/1308; F16D 2069/008; F16D 2200/0052; F16D 2200/0065; F16D 2250/00; F16D 2250/0092; B29C 70/32; B29K 2307/04; B29L 2031/16; B29L 2031/3076
USPC .......... 427/249.1, 249.3; 264/29.5, 259–265; 428/36.1, 36.2; 156/148, 149
See application file for complete search history.

(56) References Cited

U.S. PATENT DOCUMENTS

| | | | |
|---|---|---|---|
| 6,083,436 A * | 7/2000 | Thompson | F16D 65/126 264/109 |
| 6,129,122 A | 10/2000 | Bilisik | |
| 6,183,583 B1 | 2/2001 | Duval et al. | |
| 6,767,602 B1 | 7/2004 | Duval et al. | |
| 8,757,958 B2 | 6/2014 | Lussier | |
| 8,926,933 B2 | 1/2015 | Zhang et al. | |
| 9,574,300 B2 | 2/2017 | Shah et al. | |
| 9,926,201 B1 | 3/2018 | Kessler et al. | |
| 10,632,353 B2 | 4/2020 | Mordasini et al. | |
| 2002/0056782 A1* | 5/2002 | Gabrys | B29C 53/845 242/437.3 |
| 2004/0037984 A1 | 2/2004 | Ueda et al. | |
| 2004/0074075 A1 | 4/2004 | James et al. | |
| 2006/0071373 A1 | 4/2006 | Bauer et al. | |
| 2010/0037441 A1 | 2/2010 | Lescostaouec | |
| 2010/0065389 A1* | 3/2010 | Gilboy | F16D 65/092 29/428 |
| 2016/0116010 A1 | 4/2016 | Valle et al. | |
| 2016/0332881 A1 | 11/2016 | Troester et al. | |
| 2017/0151712 A1* | 6/2017 | La Forest | B32B 5/12 |
| 2017/0283330 A1* | 10/2017 | Fryska | C23C 16/26 |
| 2017/0328429 A1* | 11/2017 | Valle | F16D 65/125 |
| 2019/0210251 A1* | 7/2019 | Fabre | B29C 53/56 |
| 2019/0219120 A1 | 7/2019 | Leonard | |
| 2019/0375185 A1 | 12/2019 | Kratzer et al. | |
| 2021/0102590 A1* | 4/2021 | Shula | B32B 5/06 |

FOREIGN PATENT DOCUMENTS

| | | | |
|---|---|---|---|
| EP | 2531558 B1 | 8/2018 | |
| GB | 2177431 A * | 1/1987 | B29C 33/56 |
| GB | 2177431 A | 1/1987 | |
| GB | 2489076 A * | 9/2012 | B32B 1/08 |
| WO | 2007007045 A1 | 1/2007 | |
| WO | 2010003494 A1 | 1/2010 | |
| WO | 2012114061 A1 | 8/2012 | |

OTHER PUBLICATIONS

U.S. Appl. No. 17/407,056, filed Aug. 19, 2021, naming inventors Tang et al.
U.S. Appl. No. 17/407,024, filed Aug. 19, 2021, naming inventors Glen et al.
Extended Search Report from counterpart European Application No. 20198822.7, dated Feb. 22, 2021, 7 pp.
Office Action from U.S. Appl. No. 16/596,557, dated Feb. 2, 2021, 21 pp.
U.S. Appl. No. 16/596,557, filed Oct. 8, 2019, naming inventor Brian Shula.
Mohan et al., "Performance of 3-D Polar Weave Carbon-Carbon Composites in High Thermal Erosive Environment," International Journal of Mechanical Engineering and Technology (IJMET), ISSN Print: 0976-6340, vol. 8, Issue 3, Mar. 2017, 10 pp.
Cirino et al., "The Effect of Fiber Orientation on the Abrasive Wear Behavior of Polymer Composite Materials," Jun. 30, 1987, 15 pp.
Response to Office Action dated Feb. 2, 2021, from U.S. Appl. No. 16/596,557, filed Apr. 15, 2021, 14 pp.
Response to Extended Search Report dated Feb. 22, 2021, from counterpart European Application No. 20198822.7, filed Apr. 1, 2021, 17 pp.
Final Office Action from U.S. Appl. No. 16/596,557, dated Sep. 16, 2021, 22 pp.
Notice of Allowance from U.S. Appl. No. 16/596,557, dated Dec. 3, 2021, 10 pp.
Response to Office Action dated Sep. 16, 2021, from U.S. Appl. No. 16/596,557, filed Nov. 16, 2021, 9 pp.
Notice of Intent to Grant and Text Intended to Grant from counterpart European Application No. 20198822.7 dated Jan. 24, 2023, 41 pp.

* cited by examiner

METHOD FOR MANUFACTURING COMPOSITE FIBER PREFORM FOR DISC BRAKES

TECHNICAL FIELD

The disclosure relates to the manufacture of carbon-carbon composite materials, such as the manufacture of aircraft brake discs made of carbon-carbon composite materials.

BACKGROUND

Carbon-carbon composite materials are composite materials that include a matrix including carbon reinforced with carbon fibers. Carbon-carbon (C—C) composite components can be used in many high temperature applications. For example, the aerospace industry employs C—C composite components as friction materials for commercial and military aircraft, such as friction brake materials.

Some carbon-carbon composites, such as some carbon-carbon composite brake discs that are used in the aerospace industry, may be manufactured from porous preforms that include layers of carbon fiber, which may be densified using one or more of several processes, including chemical vapor deposition/chemical vapor infiltration (CVD/CVI), vacuum/pressure infiltration (VPI), or resin transfer molding (RTM), to infiltrate the porous preform with carbon.

SUMMARY

In some examples, the disclosure describes a fiber preform defining an annulus extending along a central longitudinal axis, the fiber preform including a plurality of layers and a plurality of radial fibers. The plurality of layers extend in an axial direction and a circumferential direction relative to the longitudinal axis. Each layer of the plurality of layers is formed from a plurality of elongate fibers that include elongate axial fibers extending substantially in the axial direction and elongate circumferential fibers extending substantially in the circumferential direction. At least about 40% of the plurality of elongate fibers extend substantially in the axial direction. The plurality of radial fibers, extending substantially in the radial direction relative to the longitudinal axis, mechanically bind one or more adjacent layers of the plurality of layers.

In some examples, the disclosure describes a fiber preform defining a cylinder extending along a central longitudinal axis. The fiber preform includes a plurality of fibrous layers and a plurality of radial fibers. The plurality of fibrous layers extend in an axial direction and a circumferential direction relative to the cylinder. Each layer of the plurality of layers includes a woven fabric that includes a plurality of elongate axial fibers extending substantially in the axial direction and a plurality of elongate circumferential fibers extending substantially in the circumferential direction. At least 40% of fibers of the woven fabric extend substantially in the axial direction. The plurality of radial fibers extends substantially in the radial direction relative to the cylinder and mechanically bind one or more adjacent layers of the plurality of layers.

In some examples, the disclosure describes carbon-carbon composite disc brake defining an annulus extending along a central longitudinal axis. The carbon-carbon composite disc brake includes a plurality of layers and a plurality of radial carbon fibers. The plurality of layers extend in an axial direction and a circumferential direction relative to the longitudinal axis. Each layer of the plurality of layers includes a plurality of elongate carbon fibers that include a plurality of elongate axial fibers extending substantially in the axial direction and a plurality of elongate circumferential fibers extending substantially in the circumferential direction. At least 40% of the plurality of elongate fibers extend substantially in the axial direction. The plurality of radial carbon fibers extend substantially in the radial direction relative to the longitudinal axis and mechanically bind one or more adjacent layers of the plurality of layers.

In some examples, the disclosure describes a method that includes winding a composite fabric around a mandrel to form a plurality of layers defining an annulus extending along a central longitudinal axis. The composite fabric including a plurality of elongate axial fibers extending substantially in an axial direction relative to the longitudinal axis and a plurality of elongate circumferential fibers extending substantially in a circumferential direction relative to the longitudinal axis. The method also includes introducing, into at least a portion of the plurality of layers, a plurality of radial fibers extending substantially in the radial direction relative to the longitudinal axis. The plurality of radial fibers mechanically bind one or more adjacent layers of the plurality of layers.

In some examples, the disclosure describes a method for forming a composite brake pad that includes wrapping a carbon fiber fabric around a rotating mandrel to form a plurality of layers defining a cylinder extending along a central longitudinal axis. The carbon fiber fabric includes a plurality of elongate carbon fibers, at least 40% of which extend in the axial direction. The method also includes at least one of tufting or needling the plurality of layers to introduce radially extending fibers into the plurality of layers to form a carbon fiber preform. The method also includes pyrolyzing the carbon fiber preform, at least partially densifying the carbon fiber preform, and sectioning the carbon fiber preform into discs defining a plurality of composite disc brakes.

In some examples, the disclosure describes a system that includes a composite fabric source and a mandrel. The composite fabric source includes a composite fabric. The mandrel is configured to wind the composite fabric around the mandrel to form a fiber preform defining an annulus extending along a central longitudinal axis. The fiber preform includes a plurality of layers and a plurality of radial fibers. The plurality of layers extend in an axial direction and a circumferential direction relative to the longitudinal axis. Each layer of the plurality of layers includes a plurality of elongate fibers that includes a plurality of elongate axial fibers extending substantially in the axial direction and a plurality of elongate circumferential fibers extending substantially in the circumferential direction. At least 40% of the plurality of elongate fibers extend substantially in the axial direction. The plurality of radial fibers extend substantially in the radial direction relative to the longitudinal axis and mechanically bind one or more adjacent layers of the plurality of layers.

The details of one or more examples of the disclosure are set forth in the accompanying drawings and the description below. Other features, objects, and advantages of the disclosure will be apparent from the description and drawings, and from the claims.

DETAILED DESCRIPTION

The present disclosure describes, in some examples, a fiber preform used to produce a composite friction material that may be used, for example, to form a disc brake. The described fiber preforms may define an annulus extending along a central longitudinal axis. The fiber preform may include a plurality of layers extending in an axial direction and a circumferential direction relative to the longitudinal axis. Each layer of the plurality of layers may include a composite fabric. The composite fabric includes a plurality of elongate fibers extending along a long axis. In some examples, at least 40% of the long axis of the fibers of the plurality of elongate fibers extend in the axial direction relative to the longitudinal axis. For example, a majority of the fibers of the plurality of elongate fibers may extend in the axial direction relative to the longitudinal axis, the remaining fibers extending in the circumferential direction or the radial direction relative to the longitudinal axis. In some examples, the percentage of fibers extending in each of the axial, circumferential, and radial directions may be selected to improve the friction properties, shear strength, torque strength, and combinations thereof.

Composite friction materials, such as composite aircraft brakes, wear during operation. In the example of aircraft brakes, increasing the usable life of the brakes may be accomplished by increasing a wear pin length, decreasing a wear rate of the friction material, or both. Often, the wear pin is already at a maximum length. Hence, decreasing wear rate may be beneficial. Fiber orientation in composites may affect wear rates and thermal conductivity. In some examples, composite aircraft brakes include alternating layers of radial and chordal fiber segments, such that a majority of the fibers lie in the radial and chordal directions of the brake disc. Needling may be used to introduce a relatively low percentage fibers in the axial direction.

Orienting a majority of fibers of a composite friction material in an axial direction relative to the longitudinal axis of an annulus defined by the disc brake, for example, normal to a friction surface, may decrease wear rate, increase thermal conductivity (in the axial direction), and increase useable life of the composite friction material. Additionally or alternatively, axial orientation of a majority of fibers may improve thermal conductivity from the friction surface to heatsinks, such as a backing plate. For example, by better conducting heat, the axially oriented fibers may lower peak temperatures and/or reduce time at temperature exposure during operation, which may increase a useable life of the friction material and/or an antioxidant coating on the friction material. Additionally or alternatively, axial orientation of a majority of fibers may improve mid-disc densification via chemical vapor infiltration or chemical vapor deposition (CVI/CVD) process by providing preferentially-oriented fibers, which may reduce density gradients, potentially increase bulk density leading to lower bulk temperatures, and/or potentially reduce the number of CVI/CVD cycles to achieve required density.

Figure 1:
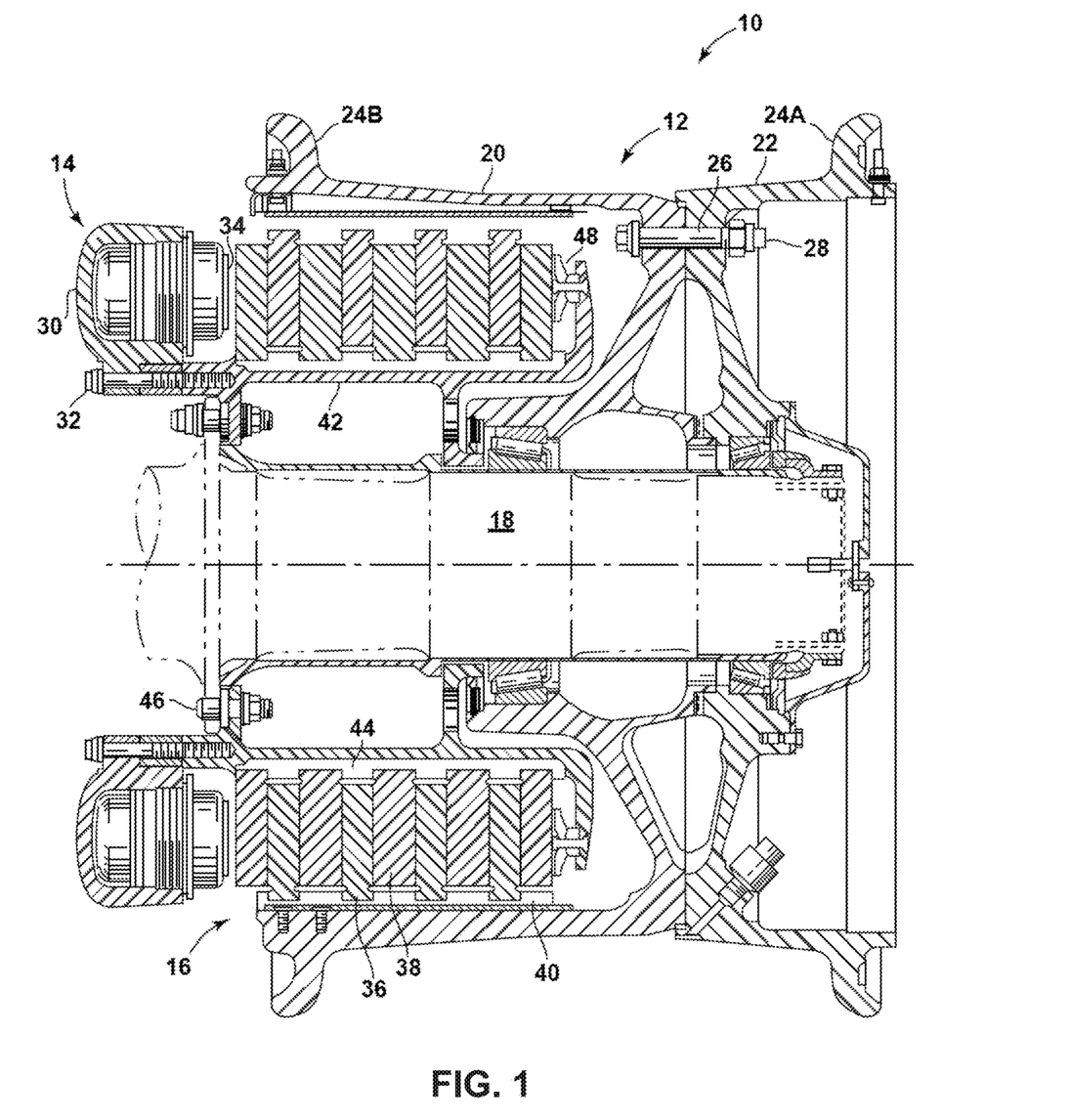
FIG. 1 is a conceptual diagram illustrating an example wheel and brake assembly that may include one or more of disc brakes formed in accordance with the techniques and structural features of this disclosure.

FIG. 1 is a conceptual diagram illustrating an example wheel and brake assembly 10 that may include one or more of disc brakes formed in accordance with the techniques and structural features of this disclosure. For ease of description, examples of the disclosure will be described primarily with regard to aircraft brake assemblies formed of composite friction materials. However, the techniques of this disclosure may be used to form composite friction materials other than aircraft brake discs. For example, the composite friction materials may be used in other types of vehicles or friction material applications which may benefit from, e.g., improved wear rate and/or improved thermal conductivity.

In the example of FIG. 1, wheel and brake assembly 10 includes a wheel 12, an actuator assembly 14, a brake stack 16, and an axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and piston 34. Brake stack 16 includes alternating rotor brake discs 36 and stator brake discs 38; rotor brake discs 36 are configured to move relative to stator brake discs 38. Rotor brake discs 36 are mounted to wheel 12, and in particular wheel hub 20, by beam keys 40. Stator brake discs 38 are mounted to axle 18, and in particular torque tube 42, by splines 44. Wheel and brake assembly 10 may support any variety of private, commercial, or military aircraft or other type of vehicle.

Wheel and brake assembly 10 includes wheel 12, which in the example of FIG. 1 is defined by a wheel hub 20 and a wheel outrigger flange 22. Wheel outrigger flange 22 may be mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel and brake assembly 10 may be mounted to a vehicle via torque tube 42 and axle 18. In the example of FIG. 1, torque tube 42 is affixed to axle 18 by a plurality of bolts 46. Torque tube 42 supports actuator assembly 14 and stator brake discs 38. Axle 18 may be mounted on a strut of a landing gear (not shown) or other suitable component of the vehicle to connect wheel and brake assembly 10 to the vehicle.

During operation of the vehicle, braking may be necessary from time to time, such as during landing and taxiing procedures of an aircraft. Wheel and brake assembly 10 is configured to provide a braking function to the vehicle via actuator assembly 14 and brake stack 16. Actuator assembly 14 includes actuator housing 30 and piston 34. Actuator assembly 14 may include different types of actuators such as one or more of, e.g., an electrical-mechanical actuator, a hydraulic actuator, a pneumatic actuator, or the like. During operation, a piston 34 may extend away from actuator housing 30 to axially compress brake stack 16 against compression point 48 for braking.

Brake stack 16 includes alternating rotor brake discs 36 and stator brake discs 38. Rotor brake discs 36 are mounted to wheel hub 20 for common rotation by beam keys 40. Stator brake discs 38 are mounted to torque tube 42 by splines 44. In the example of FIG. 1, brake stack 16 includes four rotors and five stators. However, a different number of rotors and/or stators may be included in brake stack 16 in other examples.

Rotor brake discs 36 and stator brake discs 38 may provide opposing friction surfaces for braking an aircraft. As kinetic energy of a moving aircraft is transferred into thermal energy in brake stack 16, temperatures may rapidly increase in brake stack 16. As such, rotor brake discs 36 and stator brake discs 38 that form brake stack 16 may include robust, thermally stable materials capable of operating at very high temperatures.

In one example, rotor brake discs 36 and/or stator brake discs 38 are formed as a carbon-carbon (C—C) composite in the form of an annulus that defines a set of opposing wear surfaces. The C—C composite may be fabricated using any suitable manufacturing technique or combination of techniques including, for example, vacuum pressure infiltration (VPI), resin transfer molding (RTM), chemical vapor infiltration (CVI), chemical vapor deposition (CVD), additive manufacturing, mechanical machining, ablation techniques, or the like using the fiber preforms describe herein as the starting substrate.

In some examples, rotor brake discs 36 and stator brake discs 38 may be mounted in wheel and brake assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor brake discs 36 and wheel hub 20. In some examples, wheel and brake assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator brake discs 38 may include a plurality of radially inwardly disposed lug notches along an inner diameter of the brake disc configured to engage with splines 44. Similarly, rotor brake discs 36 may include a plurality of radially inwardly disposed lug notches along an outer diameter of the brake disc configured to engage with beam keys 40. As such rotor brake discs 36 will rotate with the motion of the wheel while stator brake discs 38 remain stationary allowing the friction surfaces of an adjacent stator brake disc 38 and rotor brake disc 36 to engage with one another to deaccelerate the rotation of wheel 12.

Figure 2:
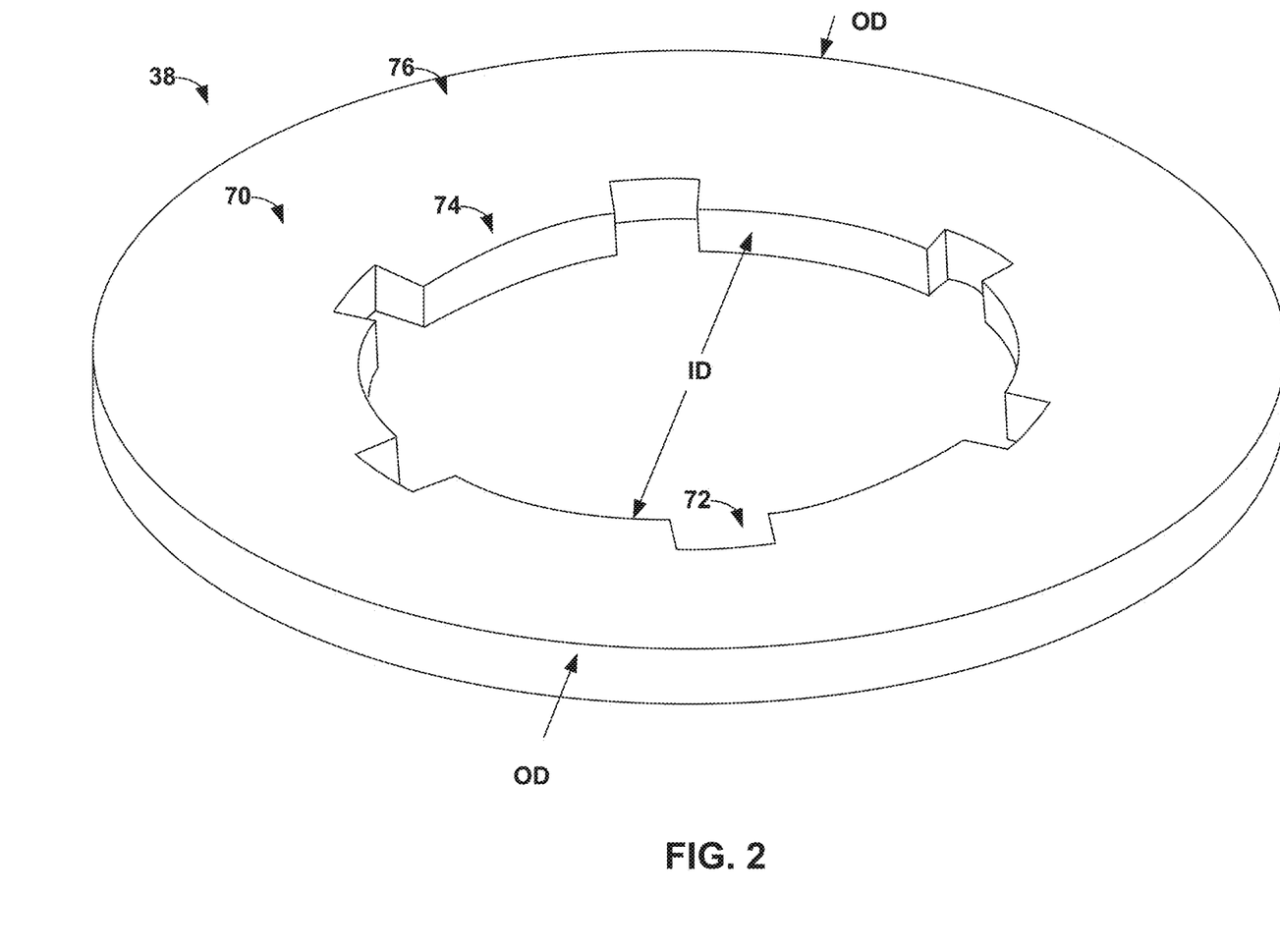
FIG. 2 is a schematic perspective view of an example stator brake disc that defines both an inner diameter (ID) and an outer diameter (OD).

FIG. 2 is a schematic perspective view of an example stator brake disc 38 that defines both an inner diameter (ID) and an outer diameter (OD). Stator brake disc 38 includes opposing friction surfaces 70 positioned on opposite sides of the annulus. An inner radial section 74 along inner diameter ID of stator brake disc 38 includes a plurality of lug notches 72 cut into stator brake disc 38. Lug notches 72 are configured to engage and interlink with splines 44 of wheel and brake assembly 10. For a rotor disc brake 36, lug notches 72 would occur along an outer radial section 76 along outer diameter OD of the annulus. Lug notches 72 of a rotor disc brake 36 would be configured to engage and interlink with beam keys 40.

During a braking procedure, splines 44 and beam keys 40 may engage with the respective lug notches 72 of rotor and stator brakes discs 36 and 38 generating heat between adjacent friction surfaces 70 and transferring a large amount of torque into the brake discs. Heat generated during the braking procedure may be conducted through fibers of break disc 38. In some examples, an orientation of the underlying fiber architecture of the C—C composite may affect heat conduction. For example, heat conduction may be greater parallel to the longitudinal length of the fibers, compared to a direction transverse to the longitudinal length of the fibers. In some examples, if a majority of fibers of the C—C composite are oriented in an axial direction (relative to the circumferential direction or the radial direction), more heat may be conducted between friction surfaces 70 and/or toward the core (in the axial direction) of brake disc 38 (e.g., away from friction surface 70 in the axial direction). Transferring heat between adjacent friction surfaces and/or toward the core of brake disc 38 may reduce localized build-up of heat, which may otherwise increase wear, damage protective coatings, and/or reduce the useable life of disc brake 38. In this way, fiber architectures of disc brakes 36 and 38 may be selected to decrease wear rate, increase thermal conductivity in the axial direction, and increase useable life of the composite friction material.

Additionally, the torque forces created during the braking procedure may be transferred into the underlying fiber architecture of the C—C composite. In some examples, if the fibers of the C—C composite are oriented in a radial direction, the resultant forces may be exerted in a direction generally perpendicular to the longitudinal length of the fibers. In contrast, if the fibers are oriented in a circumferential direction (e.g., aligned perpendicular to the radial direction), the resultant forces may be exerted in a direction generally along the longitudinal length of the fibers. Fiber architectures of disc brakes 36 and 38 may be selected to provide a desired torque transfer near lug notches 72.

Figure 3A:
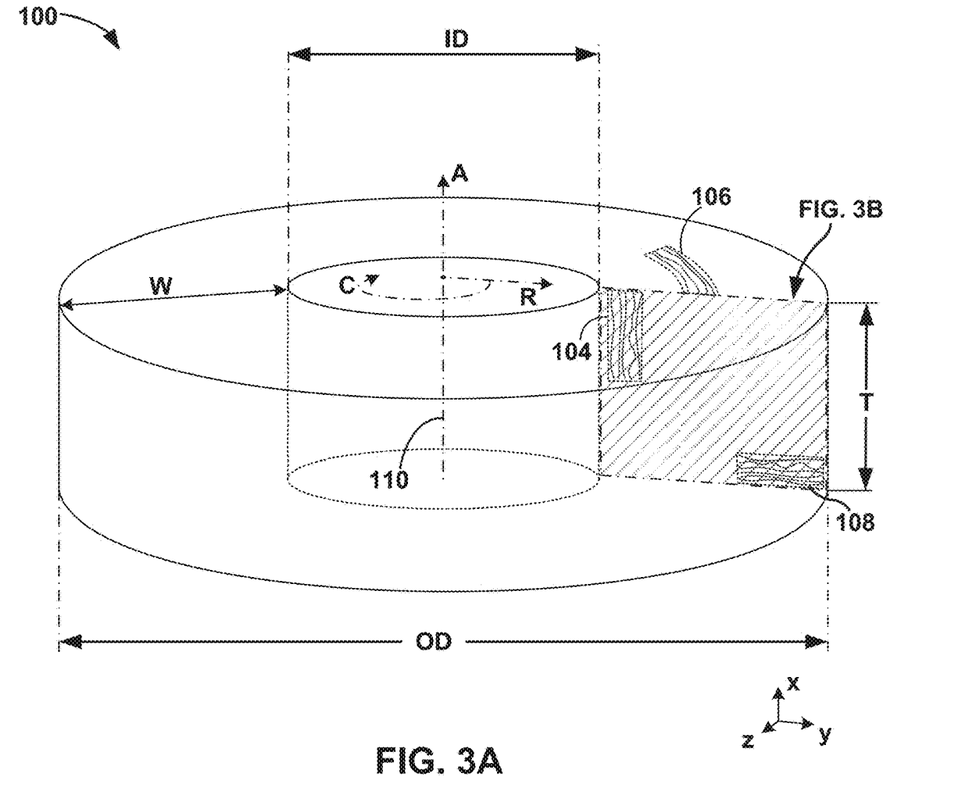
FIG. 3A is a schematic perspective view of an example fiber preform that may be used to manufacture the composite friction materials described herein.
Figure 3B:
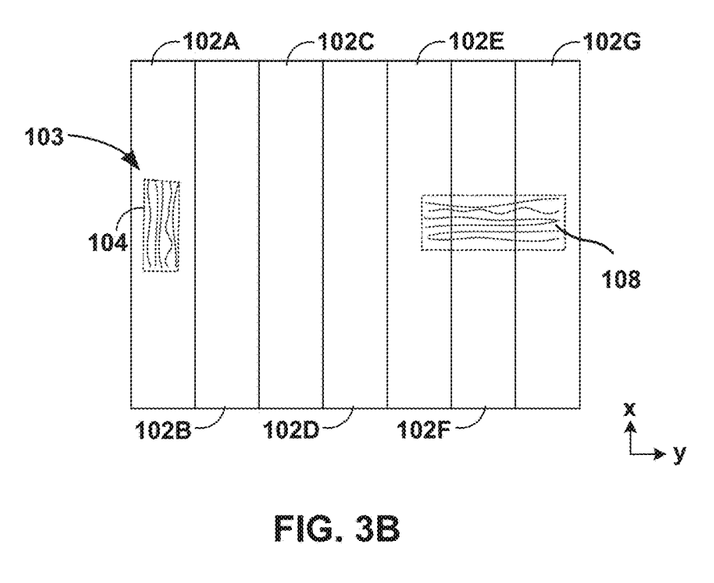
FIG. 3B is a partial cross-section of a portion of the fiber preform as indicated in FIG. 3A.

FIG. 3A is a schematic perspective view of an example fiber preform 100 that may be used to manufacture the composite friction materials described herein (e.g., rotor or stator brake discs 36 and 38 of FIGS. 1 and 2). FIG. 3B is a partial cross-section of fiber preform 100 (the cross-section is indicated in FIG. 3A). Fiber preform 100 defines an annulus extending along a central longitudinal axis 110 (e.g., extending parallel to the x-axis). Fiber preform includes a plurality of superposed fibrous layers 102 ("layers 102"). Layers 102 extend in an axial direction "A" and a circumferential direction "C" relative to the longitudinal axis. As illustrated in FIG. 3B, layers 102 include layers 102A-102G wound around longitudinal axis 110. For example, layers 102 may be continuously wound around longitudinal axis 110, e.g., in a continuous spiral. In other examples, layers 102 may include discrete rings. Layers 102 include a plurality of elongate fibers 103.

In some examples, layers 102 may include a continuous fiber fabric, such as a uniaxial fabric or a biaxial fabric. For example, each of layer 102 may include a plurality of continuous axial fibers 104 ("axial fibers 104") extending substantially in the axial direction and a plurality of continuous circumferential fibers 106 ("circumferential fibers 106") extending substantially in the circumferential direction. As used herein, extending substantially in the axial, circumferential, or radial directions may refer to extending in the respective direction relative to longitudinal axis 110 (e.g., relative to the annulus) to the extent allowable given composite fiber manufacturing tolerances, e.g., deviations not exceeding +/−5 degrees, such as +/−2 degrees. Continuous fibers may include infinitely long fibers that are continuous at least across the entirety of layers 102. In some examples, a continuous fiber fabric may include a woven fabric having any suitable weave pattern. In some examples, layers 102 may include alternating layers of a continuous fiber fabric and a nonwoven fabric.

In some examples, layers 102 may be tufted and/or needle-punched together to form fiber preform 100. The tufting process or needle-punch process may introduce a plurality of third fibers 108 ("radial fibers 108") extending substantially in the radial direction "R" into fiber preform 100. Radial fibers 108 may mechanically bind layers 102 together. For example, radial fibers 108 may secure at least one layer of layers 102 to one or more adjacent layers of layers 102. In this way, radial fibers 108 may increase an interlaminar shear strength of fiber preform 100 and/or disc brake 38 formed from fiber preform 100. Additionally or alternatively, the tufting process or the needle-punch process, and resulting radial fibers 108, may partially compress layers 102 to form a more compacted fiber preform 100 compared to a preform including a similar number of layers 102 that have not been tufted or needle-punched together.

While some of the figures described herein show a relatively small number of layers used form the respective fiber preforms, the preforms (e.g., fiber preform 100) produced as a result of the techniques describe herein may include any suitable number of layers 102 to produce the desired outer diameter OD of the resultant preform. For example, each layer 102 may have a thickness as measured in the radial parallel of about 1 millimeter (mm) to about 2 mm. Fiber preform 100, once completed, may be in the shape of an annulus defining an outer preform diameter (OD) and inner preform diameter (ID). In some examples, the outer preform diameter (OD) of fiber preform 100 may be about 14.5 inches (e.g., about 37 cm) to about 25 inches (e.g., about 64 cm) and the inner preform diameter (ID) of fiber preform 100 may be about 4.5 inches (e.g., about 12 cm) to about 15 inches (e.g., about 38 cm). Hence, in some examples, fiber preform may include between about 30 layers and about 520 layers. In other examples, fiber preform may include less than 30 layers or more than 520 layers.

In some examples, after forming preform 100, e.g., before or after any one of pyrolysis, partial densification, or densification of preform 100, preform 100 may be sectioned (e.g., cut) along the circumferential/radial plane (e.g., parallel to the yz-plane) to form a brake disc (e.g., brake disc 38). In some examples, a total thickness (T) of each sectioned portion of fiber preform 100 may be about 1 inch to about 3 inches (e.g., about 2.54 cm to about 7.62 cm).

In some examples, fiber preform 100 may be constructed with lug notches 72 (not shown in FIG. 3A) formed into either the outer diameter (OD) or inner diameter (ID) depending on whether fiber preform 100 is intended to be formed as a rotor disc brake 36 or stator disc brake 38 respectively. In some examples, a region of preform 100 at lug notches 72, for example, with about 3 inches (e.g., about 7.62 cm) of lug notches 72 may include more radial fibers 108 compared to other regions of fiber preform 100. A greater concentration of radial fibers 108 near lug notches 72 may improve torque transfer strength at lug notches 72. In some examples, lug notches may be formed together with fiber perform 100, may be cut into fiber preform 100 after the respective layers 102 have all been wound, or may be introduced after fiber preform 100 has undergone some or all of the subsequent pyrolyzation and densification procedures to convert fiber preform 100 into a C—C composite.

In some examples, the fiber preform may be in the shape of an annulus (e.g., disc-shaped) that defines both an inner diameter ID and an outer diameter OD. A cross section of the fiber preform annulus may be divided into an inner radial section, a central radial section, and an outer radial section. For example, layers 102A and 102B may define the inner radial section, layers 102C-102E may define the central radial section, and layers 102G and 102F may define the outer radial section. In other examples, the inner radial section, the central radial section, and the outer radial section may include any suitable number of layers. In other examples, the inner radial section, the central radial section, and the outer radial section may each include between about 5% to about 90% of a total width W of the annulus.

In some examples, each of the inner radial section and outer radial section may include a greater percentage of radial extending fibers (relative to axial or circumferential extending fibers), compared to a percentage of radial extending fibers in the central radial section. In some examples, a percentage of radial extending fibers may be selected based on the location of a lug region within the final fiber preform (e.g., region configured to receive lug notches that interlock with the splines or beam keys of a wheel and brake assembly).

Fibers 103 (e.g., axial fibers 104, circumferential fibers 106, and radial fibers 108) may include carbon fibers, fibers configured to subsequently pyrolyze into carbon fibers (hereinafter "carbon-precursor fibers"), or combinations thereof. Carbon-precursor fibers may include, for example, polyacrylonitrile (PAN) fibers, oxidized polyacrylonitrile (O-PAN) fibers, rayon fibers, or the like.

In some examples, axial fibers 104 and/or circumferential fibers 106, may be in the form of tows (e.g., bundles of individual fibers linearly aligned) of continuous filaments. Each tow may include hundreds to several thousand of individual fibers unidirectionally aligned to form a single tow. In such examples, layers 102 may include a fabric having a plurality of unidirectionally aligned tows within the segment with each tow including a plurality of fibers.

In some examples, layers 102 may include a duplex fabric that includes a plurality of unidirectionally aligned axial fibers 104 and/or circumferential fibers 106 (e.g., aligned tows) that have been combined with a plurality of web fibers (not shown). The web fibers may include chopped, discontinuous, or staple fibers having an unspecified alignment that are relatively short in comparison to axial fibers 104 and/or circumferential fibers 106 that, when combined with axial fibers 104 and/or circumferential fibers 106 in a duplex fabric, become intertwined with aligned axial fibers 104 and/or circumferential fibers 106 to impart integrity to each layer of layers 102. The web fibers may define a random fiber orientation relative to each other and to aligned axial fibers 104 and/or circumferential fibers 106.

In some examples, the formation of a duplex fabric may be accomplished by combining one or more layers of aligned tow fibers (e.g., axial fibers 104 and/or circumferential fibers 106) with one or more layers of web fibers that are subsequently needle-punched into the layer of tow fibers to form duplex fabric. For example, a layer of web fibers may be formed by cross-lapping a carded web to achieve a desired areal weight and then needle-punching the layer to form the web layer. Additionally, or alternatively, the web layer may be formed by air-laying the web fibers on top of a layer of the unidirectionally aligned fibers. The layer of unidirectionally aligned fibers may be formed by spreading large continuous tows using a creel, to form a sheet of the desired areal weight with fibers being aligned in the same direction. Both the web layer and the layer of unidirectionally aligned fibers may be needle-punched together to force the relatively short web fibers to become intertwined with unidirectionally aligned fibers to form the duplex fabric (e.g., layers 102).

Additionally, or alternatively layers 102 may be formed as a duplex fabric by initially incorporating web fibers within the tows of unidirectionally aligned fibers. A layer of the described tows may be formed by spreading large the tows using a creel, to form a sheet of the desired areal weight. The layer may then be needle-punched to force the relatively short web fibers to become intertwined with unidirectionally aligned fibers thereby forming the duplex fabric.

As a result of needling process in either of the above examples, the web fibers become intertwined with the aligned fibers and help bind aligned fibers together allowing layers 102 to be efficiently handled without having aligned fibers separate or fall apart with subsequent processing. The resultant duplex fabric (e.g., layers 102) may be more durable, retain its shape better, and be overall easier to further manufacture compared to a layer of only unidirectionally aligned fibers. Other techniques may also be used to form layers 102 as a duplex fabric that includes both unidirectionally aligned fibers and web fibers which may be known to those skilled in the art. In all the examples described herein, layers 102 and the fabric segments used to from the fiber preforms described herein may be composed of one or more layers of a duplex fabric.

In some examples, in addition to holding layers 102 together, the web fibers used to produce the duplex fabric may ultimately be used to form or contribute to a portion of needled fibers 104 in fiber preform 100 as a result of layers 102 being superposed (e.g., stacked on each other) and needle-punched together. Additionally, or alternatively, at least some of unidirectionally aligned fibers (e.g., axial fibers 104 and/or circumferential fibers 106) may be transformed into needled fibers 104 within fiber preform 100 as a result of layers 102 being superposed and needle-punched together. For example, the needle-punch process may break some of the unidirectionally aligned fibers contained in layers 102 and at least partially transfer the broken fibers into one or more adjacent layers 102 within fiber preform 100 to form needled fibers 104.

Both the web fibers and unidirectionally aligned fibers 103 may be formed of the same carbon fiber or carbon fiber precursor materials, may be formed of different carbon fiber or carbon fiber precursor materials, or may be formed of different combinations of carbon fiber and/or carbon fiber precursor materials. In some examples, layers 102 may be formed to have an areal weight of about 500 grams per square meter (g/m$^2$) to about 2500 g/m$^2$ such as, about 597 g/m$^2$ to about 1346 g/m$^2$.

Figure 4:
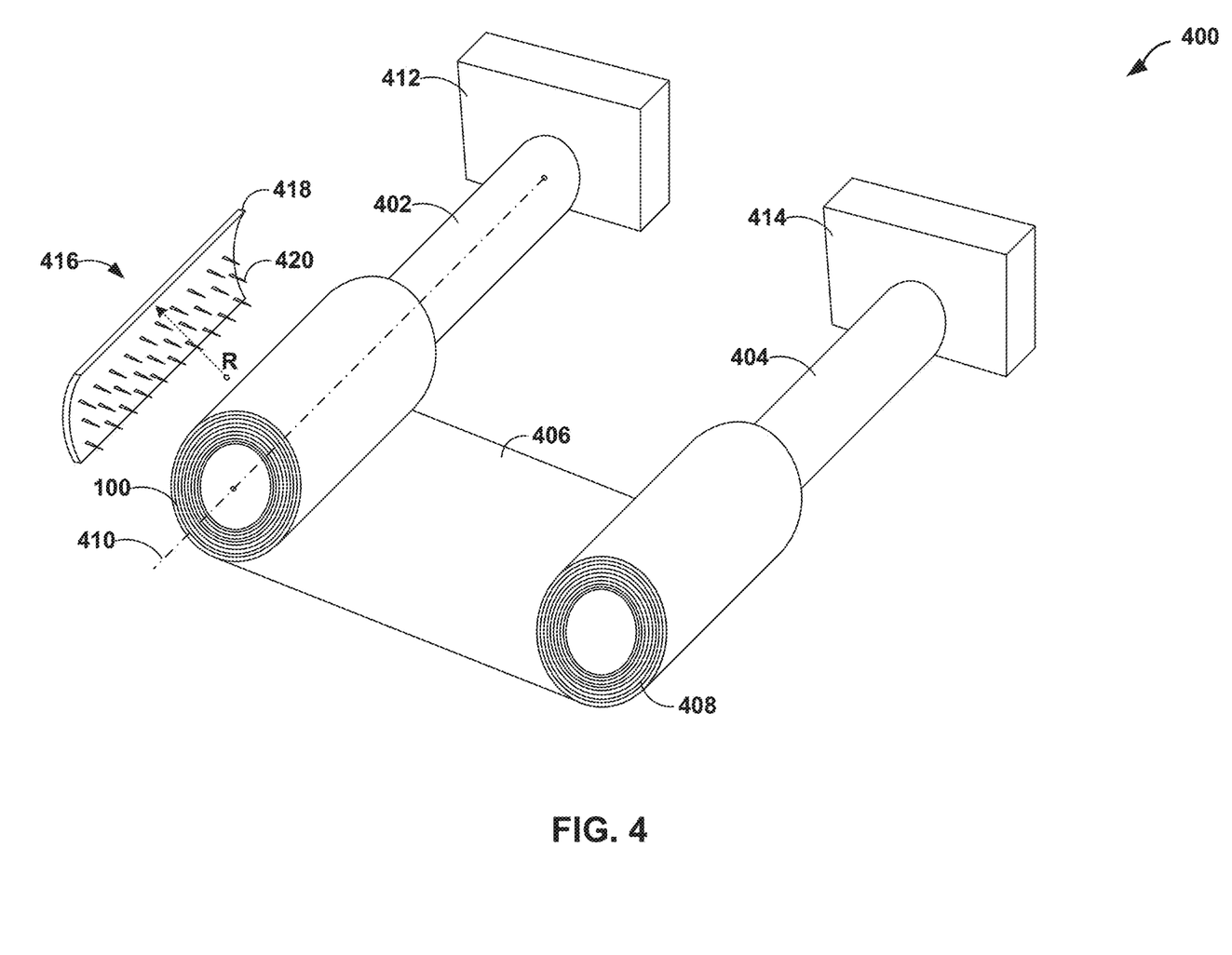
FIG. 4 is a conceptual diagram illustrating an example system for manufacturing the fiber preform of FIG. 3A.

FIG. 4 is a conceptual diagram illustrating an example system 400 for manufacturing fiber preform 100. System 400 includes a first mandrel 402 and a second mandrel 404. System 400 is configured to wind a composite fabric 406 into fiber preform 100.

First mandrel 402 is configured to wind composite fabric 406 from a fabric source 408 into fiber preform 100. First mandrel 402 extends along central longitudinal axis 410. In some examples, first mandrel 402 is coupled to motor 412. Motor 412 is configured to controllably rotate first mandrel 402 to wind composite fabric 406 around first mandrel 402. In some example, motor 412 may include a variable speed motor communicatively coupled to a controller (not shown). The controller may be configured to control a speed of rotation of mandrel 402.

In some examples, first mandrel 402 may include a material that can be heated to between about 1900° C. and about 2500° C. For example, first mandrel 402 may include a graphite mandrel. In some examples, first mandrel 402 may include a graphite ring removably attached to a metal rod.

In some examples, fabric source 408 may be wound around second mandrel 404. Second mandrel 404 may be coupled to a tensioner 414. Tensioner 414 may include, for example, an electric motor or a braking system configured to provide a selected tension on composite fabric 406 as first mandrel 402 is rotated to wind composite fabric 406 onto first mandrel 402. In other examples, system 400 may include one or more tensioning rollers configured to provide a selected tension on composite fabric 406 as first mandrel 402 is rotated to wind composite fabric 406 onto first mandrel 402. In some examples, the selected tension may affect a density of fiber preform 100, e.g., a fiber volume relative to a total volume of fiber preform 100. For example, a greater tension during winding may result in a denser fiber preform 100 compared to a lesser tension. In some examples, a tension may be selected to result in a selected fiber volume relative to a total volume of fiber preform 100. For example, a tension may be selected to result in a percent fiber volume relative to a total volume of fiber preform 100 between about 15% to about 50%, such as about 22% to about 25%.

System 400 also may include needler 416. As discussed above, a needle-punch process using needler 416 may introduce a plurality of fibers extending in the radial direction, e.g., relative to central longitudinal axis 410. For example, needle-punching using needler 416 may cause at least a portion of fibers of composite fabric to break and at least partially transfer the broken fibers to extend in the radial direction.

Needler 416 may include a curved member 418 having a plurality of needles 420. Curved member 418 has a radius of curvature R. The radius of curvature R of curved member 418 may be selected to correspond to a radius of curvature of fiber preform 100. For example, a discussed above, fiber preform 100 may include an inner radial section, a central radial section, and an outer radial section. The radius of curvature of curved member 418 may be the same as or substantially similar to a radius of curvature of fiber preform 100 during winding of the inner radial section (e.g., inner diameter ID of fiber preform 100), a radius of curvature of fiber preform 100 during winding of the outer radial section (e.g., outer diameter OS of fiber preform 100), or a radius between inner diameter ID and outer diameter OD.

In some examples, system 400 may include a plurality of needlers 416. For example, system 400 may include a first needler having a first radius that is the same as or substantially similar to a radius of curvature of fiber preform 100 during winding of inner radial section (e.g., inner diameter ID of fiber preform 100). Additionally, system 400 may include a second needler having a second radius (different from the first radius) that is the same as or substantially similar to a radius of curvature of fiber preform 100 during winding of the outer radial section (e.g., outer diameter OD of fiber preform 100).

In some examples, needler 416 may be coupled to a piston or mechanical actuator (not shown) configured to controllably depress needles 420 into fiber preform 100 as composite fabric 406 is being wound onto first mandrel 402. In some examples, the frequency and/or the timing of the depressions may be controlled to provide a selected amount of radial fibers in selected regions of fiber preform 100. For example, during winding of the inner radial section, a first frequency of depressions may provide a greater amount of radial fibers relative to a central radial section wound with a second frequency of depressions, the second frequency being less than the first frequency. Similarly, during winding of the outer radial section, a third frequency of depressions that is greater than the second frequency may provide a greater amount of radial fibers relative to a central radial section. In this way, fiber preform 100 may be formed to have a selected amount (e.g., percentage) of radially extending fibers relative to axial and/or circumferentially extending fibers.

Additionally or alternatively to needler 416, system 400 may include a tufting device (not shown). The tufting device may include a one or more needles configured to introduce one or more fibers extending in the radial direction into fiber preform 100. For example, needles of the tufting device may introduce a loop of fiber in the radial direction. Tufting to introduce fibers extending in the radial direction may reduce damage of the fibers of composite fabric 100 while still providing fibers extending in the radial direction to mechanically bond one or more adjacent layers of the plurality of layers of fiber preform 100. Additionally or alternatively, tufting to introduce fibers extending in the radial direction may be faster and/or less expensive relative to other processes of introducing radial fibers, such as, for example, three dimensional weaving or three dimensional braiding.

Figure 5A:
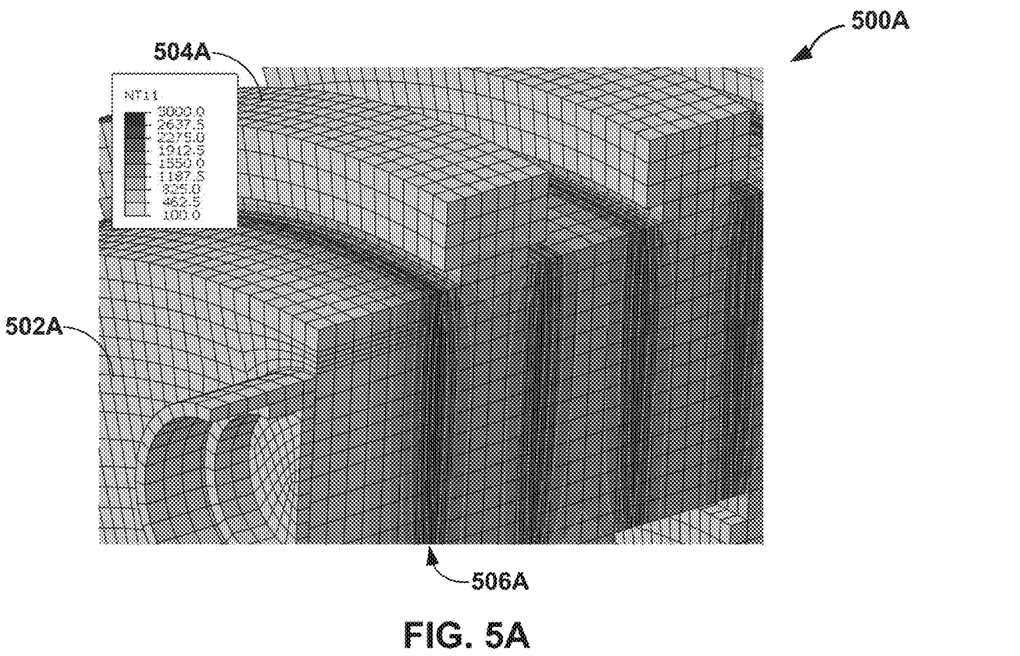
FIGS. 5A and 5B are heat maps illustrating example peak temperature during braking procedures of an example friction composite material manufactured using the techniques described herein and an example non-woven friction composite material.

FIGS. 5A and 5B are heat maps 500A and 500B of an example rotor brake disc and adjacent stator brake disc interface. As illustrated in FIG. 5A, rotor brake disc 502A and adjacent stator brake disc 504A may define friction surface interface 506A. Rotor brake disc 502A and stator brake disc 504A include a non-woven friction composite. During braking procedure, friction between rotor brake disc 502A and stator brake disc 504A at friction surface interface 506A generates heat. As indicated in heat map 500A, the temperature of friction surface interface 506A is about 2800° F. In some examples, such temperatures may increase wear of rotor brake disc 502A and stator brake disc 504A, damage protective coatings on rotor brake disc 502A and stator brake disc 504A, and/or reduce the useable life of rotor brake disc 502A and stator brake disc 504A.

Figure 5B:
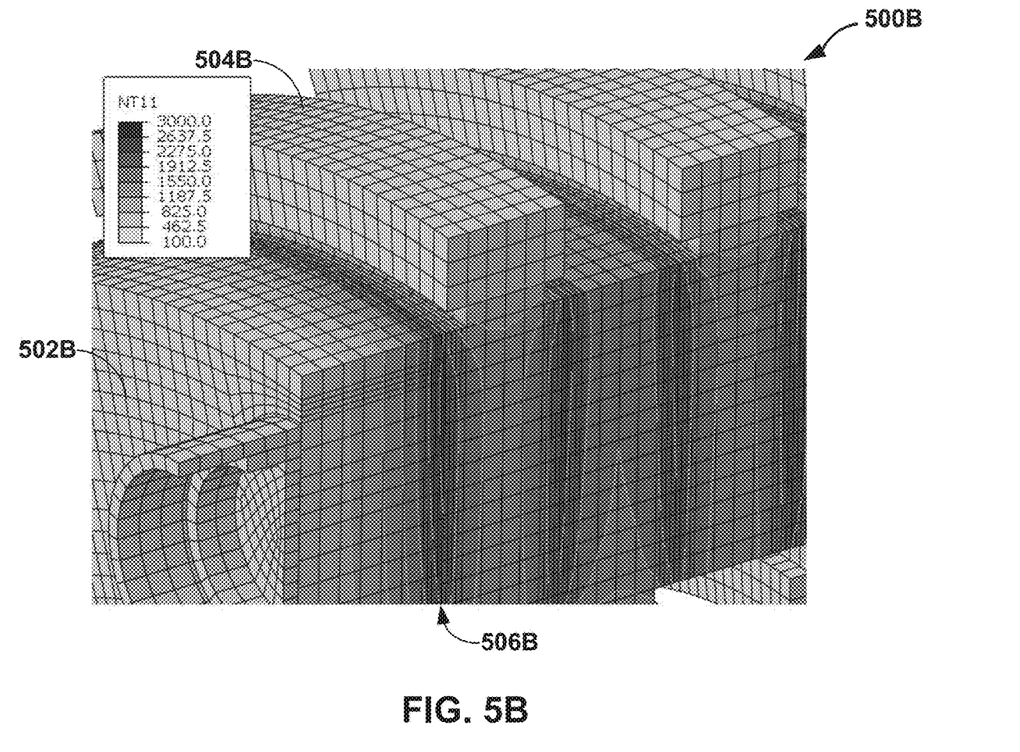

As illustrated in FIG. 5B, rotor brake disc 502B and adjacent stator brake disc 504B may define friction surface interface 506B. Rotor brake disc 502B and stator brake disc 504B material 502B include a friction composite material manufactured using the techniques described herein. As indicated in heat map 500B, during braking procedures, the temperature of friction surface interface 506B is less 2800° F., such as less than about 2400° F. This reduction in temperature (e.g., relative to the example of FIG. 5A) may reduce wear of rotor brake disc 502B and stator brake disc 504B and/or improve the useable life of protective coatings such as antioxidant coatings on rotor brake disc 502B and stator brake disc 504B. In this way, brake discs including friction composite materials manufactured using the techniques described herein may increase the useable life of the brake discs.

Figure 6:
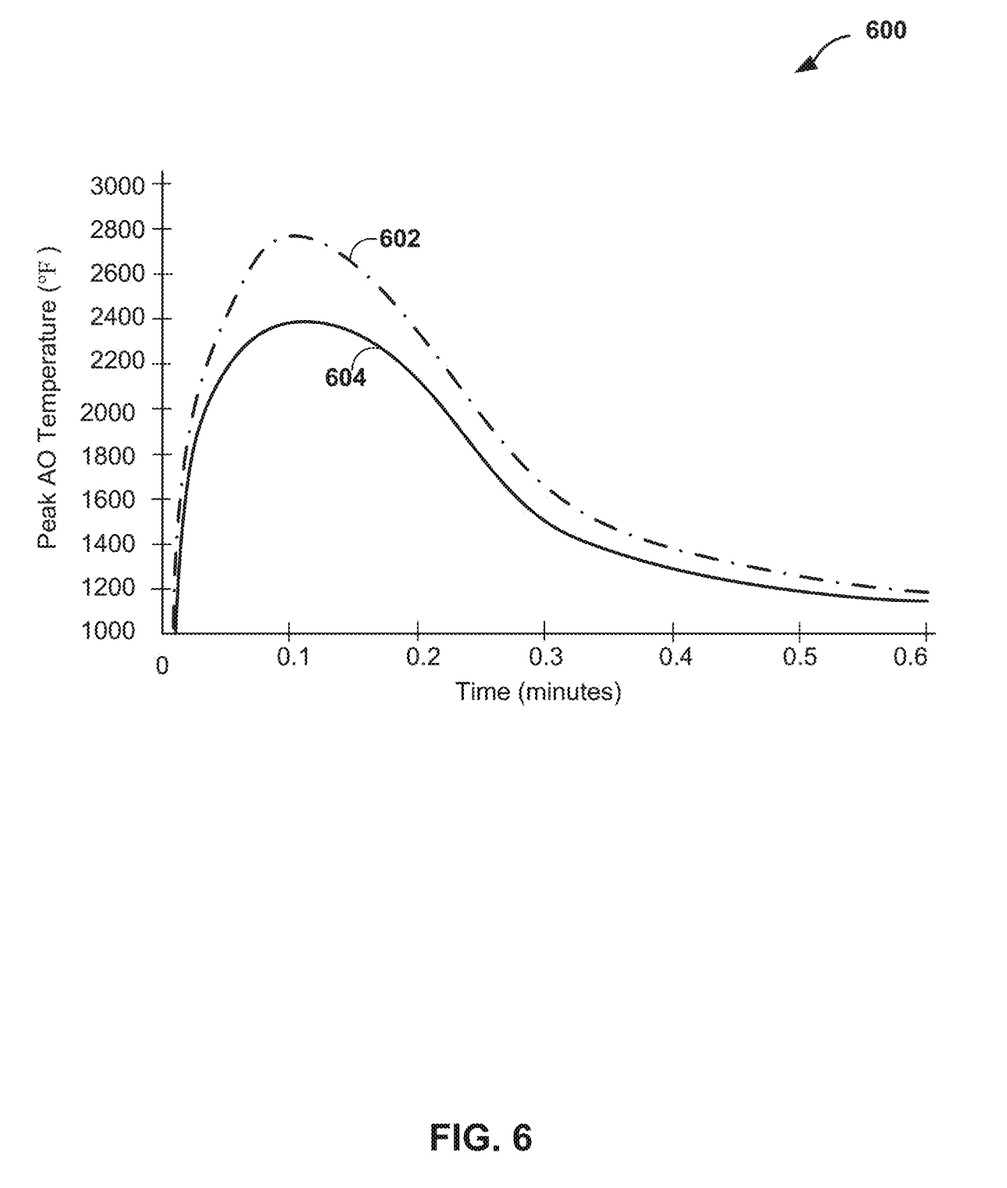
FIG. 6 is a graph of peak antioxidant temperature versus time for an example friction composite material manufactured using the techniques described herein and an example non-woven friction composite material.

FIG. 6 is a graph 600 of peak antioxidant (AO) temperature versus time for an example friction composite material manufactured using the techniques described herein and an example non-woven friction composite material. Line 602 illustrates the temperature of the example non-woven friction composite material. As illustrated in FIG. 6, the peak temperature reaches about 2800° F. during breaking procedures. After reaching the peak temperature of about 2800° F., the brake cools over time. Line 604 illustrates the temperature of the example friction composite material manufactured using the techniques described herein.

The friction composite material provides a lower thermal gradient due to the axial fibers compared to the non-woven friction composite material. For example, as illustrated in FIG. 6, the peak temperature of the described friction composite material reaches less than about 2400° F. during breaking procedures. In some examples, the peak temperature of the described friction composite materials may be about 550° F. less than a peak temperature of the non-woven friction composite material. In some examples, an antioxidant surface peak temperature of the described friction composite materials may be about 350° F. less than a peak temperature of the non-woven friction composite material. Additionally, the described friction composite materials spend less time above 2000° F. compared to the non-woven friction composite material.

Figure 7:
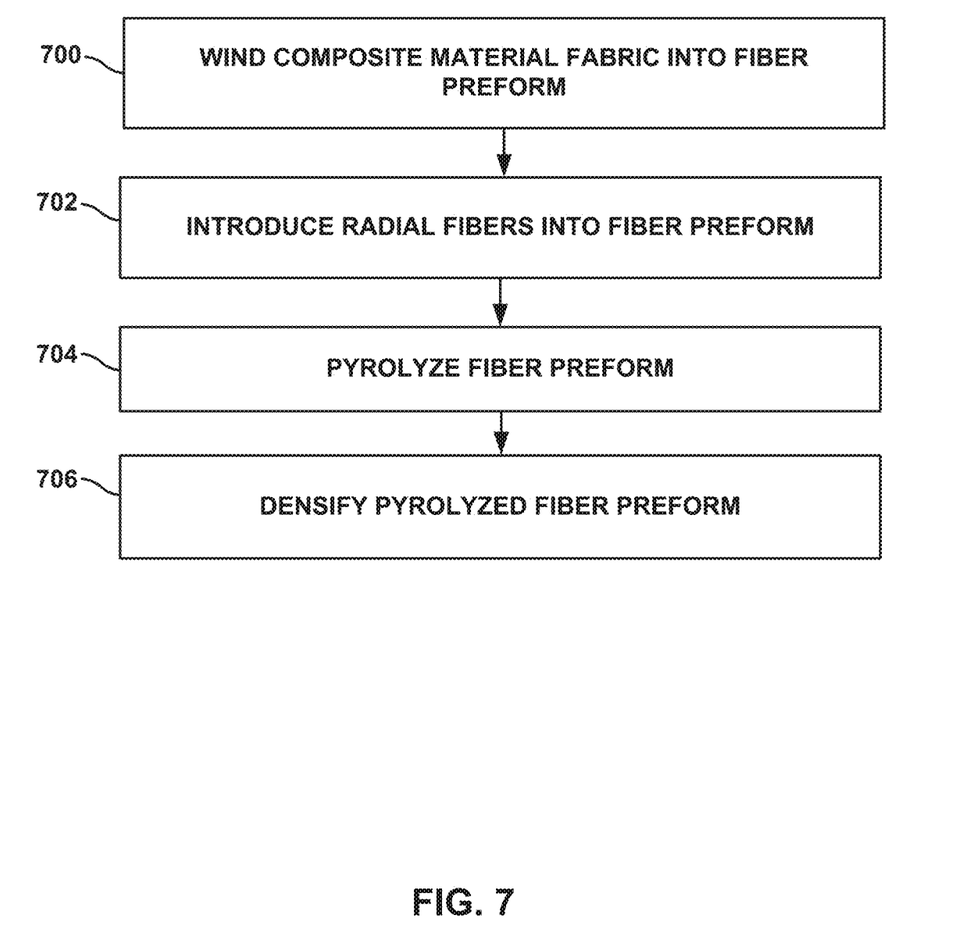
FIG. 7 is a flow diagram illustrating an example technique of manufacturing a fiber preform.

The fiber preforms and disc brakes described herein may be formed using any suitable technique. FIG. 7 is a flow diagram illustrating an example technique of manufacturing a fiber preform and disc brake. The technique illustrated in FIG. 7 is described with reference to fiber preform 100 and disc brake 38; however, other fiber preforms or disc brakes may be formed using the described techniques and fiber preform 100 and disc brake 38 may be formed using other techniques.

The example technique of FIG. 7 includes winding a composite fabric onto a mandrel to form fiber preform 100 in the shape of an annulus (700); introducing radial fibers into fiber preform 100 (702); pyrolyzing fiber preform 100 (704); and densifying the resultant preform 100 to produce disc brake 38 (706).

The technique includes winding a composite fabric onto a mandrel to form fiber preform 100 in the shape of an annulus (700). The composite fabric is wound to define each layer of layers 102. As discussed above, each layer of layers 102 includes axial fibers 104 and circumferential fibers 106. The resultant fiber preform 100 includes fibers primarily extending in the axial direction and circumferential direction. In some examples, winding a composite fabric onto a mandrel may include selecting an outer diameter of the mandrel to correspond to a selected inner diameter ID of fiber preform 100. In some examples, winding a composite fabric onto a mandrel may include controlling a number of windings to achieve a selected outer diameter OD of fiber preform 100. In some examples, winding a composite fabric onto a mandrel may include controlling a tension of the composite fabric during winding. For example, as discussed above in reference to FIG. 4, a second mandrel or a tensioning bar may be used to control a tension of composite fabric 406.

The technique also includes introducing radial fibers 108 into fiber preform 100 (702). Radial fibers 108 may be introduced by needle-punching, tufting, or a combination of both. In some examples, introducing radial fibers 108 into fiber preform 100 may include determining and/or controlling a frequency and/or a timing of needle-punching and/or tufting. For example, as discussed above, the frequency and/or the timing of needling and/or tufting may be controlled to provide a selected amount of radial fibers in selected regions of fiber preform 100. Radial fibers 108 may mechanically bind layers 102 together, partially compress layers 102 to form a more compacted fiber preform 100, or both. In this way, introducing radial fibers 108 may increase an interlaminar shear strength of fiber preform 100 and/or disc brake 38 produced using fiber preform 100.

Once fiber preform 100 has been formed, the technique may include pyrolyzing fiber preform 100 (704). Pyrolyzing fiber preform 100 may convert any carbon-precursor material into carbon through a thermal degradation process to effectively burn off any non-carbon material. For example, fiber preform 100 may be carbonized by heating fiber preform 100 in a retort under inert or reducing conditions to remove the non-carbon constituents (hydrogen, nitrogen, oxygen, etc.) from fibers 103. The carbonization can be carried out using retort, such as an autoclave, a furnace, a hot isostatic press, a uniaxial hot press, or the like. In each of these techniques, fiber preform 100 may be heated in the inert atmosphere at a temperature in the range of, e.g., about 600° C. to about 1000° C. while optionally being mechanically compressed. The mechanical compression may be used to define the geometry (e.g., thickness (T)) of fiber preform 100. In some examples, the retort may be purged with nitrogen for approximately 1 hour, then heated to about 900° C. over the course of approximately 10 hour to approximately 20 hours, followed by elevating the temperature to about 1050° C. over approximately 1 hour to approximately 2 hours. The retort then may be held at about 1050° C. for approximately 3 hours to approximately 6 hours before the carbonized preform is allowed to cool. In some examples, the carbonization step can be carried out at even higher temperature, including up to about 1800° C. or up to about 2600° C.

After pyrolyzation, the technique also includes densifying the resultant preform 100 to produce disc brake 38 (706). Fiber preform 100 may be subjected to one or more densification cycles to form a C—C composite. Example densification cycles may include, for example, being densified by applying one or more cycles of chemical vapor infiltration and/or chemical vapor deposition (CVI/CVD) of a carbonaceous gas. Any suitable carbonaceous gas may be used during the CVI/CVD processing including, for example, carbon-based gases such as natural gas, methane, ethane, propane, butane, propylene, or acetylene, or a combination thereof. In some examples, the application of the carbonaceous gas to densify a fiber preform 100 via CVI/CVD may occur substantially in a vacuum space (e.g., a vessel with an internal environment at less than 100 Torr (e.g., 13.33 kPa)) or under an inert gas environment so as to control the chemical deposition reaction. In some examples, during application of the CVI/CVD gas, the environment including fiber preform 100 may be heated to an elevated temperature, for example about 900° C. to about 1200° C., to promote the chemical deposition reaction.

In some examples, axial fibers 104 may increase penetration of the carbonaceous gas into fiber preform 100. For example, fiber preform 100 having a greater percentage of axial fibers 104 relative to total fibers 103 may have better carbonaceous gas penetration compared to a perform with a relatively lower percentage of axial fibers. Better penetration of the carbonaceous gas may improve a final density and/or reduce total time required for a desired densification.

In other examples, fiber preform 100 may be densified (706) using other suitable techniques including for example, resin infiltration and carbonization via resin transfer mold (RTM) processing, vacuum pressure infiltration (VPI) processing, high pressure infiltration (HPI), or the like. In some examples, the densification step (706) may produce a densified C—C composite substrate having a final density of about 1.60 to about 1.95 g/cc, such as about 1.65 to about 1.85 g/cc.

In some examples, before or after any one of pyrolyzing (704) or partial or complete densification (706), fiber preform 100 may be sectioned into a plurality of sections having a selected thickness. For example, fiber preform 100 may be cut using any suitable cutting method to a plurality of sections that, in some examples, may be subsequently pyrolyzed or densified.

In some examples, during or after the densification of fiber preform 100, the major friction surfaces of the resultant C—C composite may be sculpted into a desired shape, such as a final brake disc shape. For example, C—C composite substrate may be ground in the shape of a densified C—C composite disc brake having a final thickness T (e.g., about 1.4 inches). Additionally, or alternatively, lug notches 72 may be formed at this time.

In some examples, after densification (706), the technique may include application of one or more coatings to disc brake 38. For example, the technique may include application of an antioxidant coating, such as phosphorus based penetrant systems and/or barrier systems, to disc brake 38. In some examples, the one or more coatings may improve the performance of disc brake 38 and/or improve a useable life of disc brake 38.

The following clauses illustrate example subject matter described herein.

Clause 1. A method comprising: winding a composite fabric around a mandrel to form a plurality of layers defining an annulus extending along a central longitudinal axis, wherein the composite fabric comprises: a plurality of elongate axial fibers extending substantially in an axial direction relative to the longitudinal axis; and a plurality of elongate circumferential fibers extending substantially in a circumferential direction relative to the longitudinal axis; and introducing, into at least a portion of the plurality of layers, a plurality of radial fibers extending substantially in the radial direction relative to the longitudinal axis, wherein the plurality of radial fibers mechanically bind one or more adjacent layers of the plurality of layers.

Clause 2. The method of clause 1, further comprising, while winding the composite fabric, controlling a tension of the composite fabric.

Clause 3. The method of clause 2, wherein controlling the tension of the composite fabric comprises providing resistive tension to a second mandrel comprising a roll of the composite fabric.

Clause 4. The method of clause 2 or 3, wherein controlling the tension of the composite fabric comprises controlling a percent of a fiber volume relative to a total volume of the fiber preform between about 15% to about 50%.

Clause 5. The method of any one of clauses 1 through 4, wherein introducing the plurality of radial fibers comprises, during winding, needle-punching the fiber preform.

Clause 6. The method of any one of clauses 1 through 5, wherein introducing the plurality of radial fibers comprises, during winding, tufting the fiber preform.

Clause 7. The method of clause 5 or 6, wherein introducing the plurality of radial fibers further comprises controlling a frequency and a timing of at least one of needle-punching or tufting.

Clause 8. The method of any one of clauses 1 through 7, further comprising: pyrolyzing the fiber preform to carbonize at least a portion of the composite fabric; and densifying the carbonized fiber preform to form a densified carbon-carbon composite material.

Clause 9. The method of any one of clauses 1 through 8, further comprising: at least partially densifying the carbon fiber preform; and sectioning the at least partially densified carbon fiber preform into discs defining composite brake pads.

Clause 10. A method for forming a composite brake pad, the method comprising: wrapping a carbon fiber fabric around a rotating mandrel to form a plurality of layers defining a cylinder extending along a central longitudinal axis, wherein the carbon fiber fabric comprises a plurality of elongate carbon fibers, wherein at least 40% of the fibers of the plurality of elongate carbon fibers extend in the axial direction; at least one of tufting or needling the plurality of layers to introduce radially extending fibers into the plurality of layers to form a carbon fiber preform; pyrolyzing the carbon fiber preform; at least partially densifying the carbon fiber preform; and sectioning the carbon fiber preform into discs defining a plurality of composite brake disc.

Clause 11. A system comprising: a composite fabric source comprising a composite fabric; and a mandrel configured to wind the composite fabric around the mandrel to form a fiber preform defining an annulus extending along a central longitudinal axis, the fiber preform comprising: a plurality of layers extending in an axial direction and a circumferential direction relative to the longitudinal axis, wherein each layer of the plurality of layers comprises a plurality of elongate fibers comprising: a plurality of elongate axial fibers extending substantially in the axial direction; and a plurality of elongate circumferential fibers extending substantially in the circumferential direction, wherein at least 40% of the plurality of elongate fibers extend substantially in the axial direction; and a plurality of radial fibers extending substantially in the radial direction relative to the longitudinal axis, wherein the plurality of radial fibers mechanically bind one or more adjacent layers of the plurality of layers.

Clause 12. The system of clause 11, further comprising: a motor coupled to the mandrel, wherein the motor is configured to rotate the mandrel; and a controller communicatively coupled to the motor, wherein the controller is configured to control a speed of rotation of the mandrel.

Clause 13. The system of clause 11 or 12, wherein the mandrel comprises a graphite mandrel.

Clause 14. The system of clause 11 or 12, wherein the mandrel comprises a metal rod and a graphite ring coupled to at least a portion of the metal rod.

Clause 15. The system of any one of clauses 11 through 14, wherein the composite fabric source comprises a second mandrel, wherein the composite fabric is wound on the second mandrel.

Clause 16. The system of clause 15, further comprising a tensioner coupled to the second mandrel, wherein the tensioner is configured to, during winding of the composite fabric onto the first mandrel, control a tension of the composite fabric.

Clause 17. The system of any one of clauses 11 through 16, further comprising at least one tensioning bar configured to, during winding of the composite fabric onto the first mandrel, control a tension of the composite fabric.

Clause 18. The system of any one of clauses 11 through 17, further comprising a needler configured to introduce the plurality of radial fibers into selected layers of the plurality of layers.

Clause 19. The system of clause 18, wherein the needler is a first needler, the system further comprising a second needler configured to introduce the plurality of radial fibers into selected layers of the plurality of layers, wherein the first needler comprises a first curved member having a first radius of curvature, wherein the second needler comprises a second curved member having a second radius of curvature, and wherein the second radius of curvature is greater than the first radius of curvature.

Clause 20. The system of any one of clauses 11 through 19, further comprising a tufting device configured to introduce the plurality of radial fibers into selected layers of the plurality of layers.

Various examples have been described. These and other examples are within the scope of the following claims.

What is claimed is:
1. A method comprising:
winding a composite fabric around a first mandrel to form a fiber preform including a plurality of layers defining an annulus extending along a central longitudinal axis, wherein the composite fabric comprises:
a plurality of elongate axial fibers extending substantially in an axial direction relative to the longitudinal axis; and
a plurality of elongate circumferential fibers extending substantially in a circumferential direction relative to the longitudinal axis;
controlling, while winding the composite fabric, a tension of the composite fabric, wherein controlling the tension of the composite fabric includes applying resistive tension to a second mandrel comprising a roll of the composite fabric; and
introducing, into at least a portion of the plurality of layers, a plurality of radial fibers extending substantially in the radial direction relative to the longitudinal axis, wherein the plurality of radial fibers mechanically bind one or more adjacent layers of the plurality of layers.

2. The method of claim 1, wherein controlling the tension of the composite fabric comprises controlling the tension of the composite fabric such that a percent of a fiber volume relative to a total volume of the fiber preform is from about 15% to about 50%.

3. The method of claim 1, wherein introducing the plurality of radial fibers comprises, during winding, needle-punching the fiber preform.

4. The method of claim 1, wherein introducing the plurality of radial fibers comprises, during winding, tufting the fiber preform.

5. The method of claim 1, wherein introducing the plurality of radial fibers further comprises controlling a frequency and a timing of at least one of needle-punching or tufting.

6. The method of claim 1, further comprising:
pyrolyzing the fiber preform to carbonize at least a portion of the composite fabric; and
densifying the carbonized fiber preform to form a densified carbon-carbon composite material.

7. The method of claim 1, further comprising:
at least partially densifying the carbon fiber preform; and
sectioning the at least partially densified carbon fiber preform into discs defining composite brake pads.

8. A system comprising:
a composite fabric source comprising a composite fabric;

a mandrel configured to wind the composite fabric around the mandrel to form a fiber preform defining an annulus extending along a central longitudinal axis, the fiber preform comprising:
  a plurality of layers extending in an axial direction and a circumferential direction relative to the longitudinal axis, wherein each layer of the plurality of layers comprises a plurality of elongate fibers comprising:
    a plurality of elongate axial fibers extending substantially in the axial direction;
    a plurality of elongate circumferential fibers extending substantially in the circumferential direction, wherein at least 40% of the plurality of elongate axial fibers extend substantially in the axial direction; and
    a plurality of radial fibers extending substantially in the radial direction relative to the longitudinal axis, wherein the plurality of radial fibers mechanically bind one or more adjacent layers of the plurality of layers,
  a needler configured to introduce the plurality of radial fibers into selected layers of the plurality of layers, wherein the needler includes a curved member having a plurality of needles extending from the curved member, the curved member being curved about the central longitudinal axis.

9. The system of claim 8, wherein the mandrel comprises a first mandrel, and wherein the composite fabric source comprises a second mandrel, wherein the composite fabric is wound on the second mandrel.

10. The system of claim 9, further comprising a tensioner coupled to the second mandrel, wherein the tensioner is configured to, during winding of the composite fabric onto the first mandrel, control a tension of the composite fabric.

11. The system of claim 8, further comprising:
  a motor coupled to the mandrel, wherein the motor is configured to rotate the mandrel; and
  a controller communicatively coupled to the motor, wherein the controller is configured to control a speed of rotation of the mandrel.

12. The system of claim 8, wherein the mandrel comprises a graphite mandrel.

13. The system of claim 8, wherein the mandrel comprises a metal rod and a graphite ring coupled to at least a portion of the metal rod.

14. The system of claim 8, further comprising at least one tensioning bar configured to, during winding of the composite fabric onto the first mandrel, control a tension of the composite fabric.

15. The system of claim 8, wherein the needler is a first needler, the curved member is a first curved member, and the radius of curvature of the first curved member is a first radius of curvature, the system further comprising a second needler configured to introduce the plurality of radial fibers into selected layers of the plurality of layers, wherein the second needler comprises a second curved member having a second radius of curvature, and wherein the second radius of curvature is greater than the first radius of curvature.

16. The system of claim 8, further comprising a tufting device configured to introduce the plurality of radial fibers into selected layers of the plurality of layers.

17. A system comprising:
  a composite fabric source comprising a composite fabric wound around a first mandrel; and
  a second mandrel configured to wind the composite fabric from the first mandrel around the second mandrel to form a fiber preform defining an annulus extending along a central longitudinal axis, the fiber preform comprising:
    a plurality of layers extending in an axial direction and a circumferential direction relative to the longitudinal axis, wherein each layer of the plurality of layers comprises a plurality of elongate fibers comprising:
      a plurality of elongate axial fibers extending substantially in the axial direction;
      a plurality of elongate circumferential fibers extending substantially in the circumferential direction, wherein at least 40% of the plurality of elongate axial fibers extend substantially in the axial direction; and
      a plurality of radial fibers extending substantially in the radial direction relative to the longitudinal axis, wherein the plurality of radial fibers mechanically bind one or more adjacent layers of the plurality of layers.

18. The system of claim 17, further comprising a tensioner coupled to the first mandrel, wherein the tensioner is configured to, during winding of the composite fabric onto the second mandrel, control a tension of the composite fabric.

19. The system of claim 17, wherein the mandrel comprises a metal rod and a graphite ring coupled to at least a portion of the metal rod.

20. The system of claim 17, wherein the mandrel comprises a graphite mandrel.

* * * * *